(12) United States Patent
Saxena et al.

(10) Patent No.: US 8,516,563 B2
(45) Date of Patent: Aug. 20, 2013

(54) METHODS FOR AUTHENTICATING A USER WITHOUT PERSONAL INFORMATION AND DEVICES THEREOF

(75) Inventors: Ashutosh Saxena, Gujarat (IN); Harigopal K. B. Ponnapalli, Andhra Pradesh (IN)

(73) Assignee: Infosys Technologies, Ltd., Bangalore (IN)

( * ) Notice: Subject to any disclaimer, the term of this patent is extended or adjusted under 35 U.S.C. 154(b) by 95 days.

(21) Appl. No.: 13/218,515

(22) Filed: Aug. 26, 2011

(65) Prior Publication Data
US 2013/0007861 A1 Jan. 3, 2013

(30) Foreign Application Priority Data
Jun. 29, 2011 (IN) .......................... 2193/CHE/2011

(51) Int. Cl.
*G06F 7/04* (2006.01)
*G06F 17/30* (2006.01)
*G06F 12/14* (2006.01)
*G06F 15/16* (2006.01)

(52) U.S. Cl.
USPC ......... 726/7; 726/2; 726/17; 726/21; 709/229

(58) Field of Classification Search
None
See application file for complete search history.

(56) References Cited

U.S. PATENT DOCUMENTS

| | | | |
|---|---|---|---|
| 3,985,998 A | 10/1976 | Crafton | |
| 4,218,738 A | 8/1980 | Matyas et al. | |
| 5,757,918 A | 5/1998 | Hopkins | |
| 5,953,422 A | 9/1999 | Angelo et al. | |
| 6,246,769 B1 | 6/2001 | Kohut | |
| 6,369,904 B1 | 4/2002 | Bhattacharjya et al. | |
| 6,765,470 B2 | 7/2004 | Shinzaki | |
| 6,957,339 B2 | 10/2005 | Shinzaki | |
| 2002/0116616 A1* | 8/2002 | Mi et al. ........................ | 713/168 |
| 2006/0156385 A1* | 7/2006 | Chiviendacz et al. ............ | 726/2 |
| 2011/0078784 A1* | 3/2011 | Ohtani ............................ | 726/15 |
| 2011/0161660 A1* | 6/2011 | Zhang et al. ................... | 713/156 |
| 2011/0214160 A1* | 9/2011 | Costa et al. ....................... | 726/3 |
| 2012/0303830 A1* | 11/2012 | Tobioka ....................... | 709/229 |

OTHER PUBLICATIONS

Lamport, L., "Password Authentication with Insecure Communication," Communications of the ACM, 24(11):770-772 (1981).
Shimizu et al., "A Password Authentication Method for Contents Communications on the Internet," IEICE Trans. on Commun., E81-B(8):1666-1673 (1998).

(Continued)

*Primary Examiner* — Nathan Flynn
*Assistant Examiner* — Trang Doan
(74) *Attorney, Agent, or Firm* — LaClairRyan, a Professional Corporation

(57) ABSTRACT

A method, non-transitory computer readable medium, and apparatus that authenticates a user without personal information includes obtaining at a secure authentication computing apparatus a context identifier, a registration identifier of one of a plurality of string generator modules assigned to a client computing device requesting access, and a client string generated by the client computing device requesting access from an agent computing device associated with the client computing device requesting access. An authentication string is generated with the secure authentication computing apparatus based on the obtained context identifier and a corresponding one of the plurality of string generator modules provided to the client computing device requesting access based on the registration identifier. The requested access by the client computing device is granted with the secure authentication computing apparatus when the client string matches the authentication string.

15 Claims, 2 Drawing Sheets

(56) References Cited

OTHER PUBLICATIONS

Yeh et al., "A Secure One-Time Password Authentication Scheme Using Smart Cards," IEICE Trans. on Commun., E85-B(11):2515-2518 (2002).

Lee et al., "A Remote User Authentication Scheme Using Hash Functions," ACM Operating Systems Review, 36 (4):23-29 (2002).

Das et al., "A Dynamic ID-based Remote User Authentication Scheme," IEEE Trans. on Consumer Electron., 50 (2):629-631 (2004).

Ku, W.C., "A Hash-Based Strong-Password Authentication Scheme without Using Smart Cards," ACM Operating Systems Review, 38(1):29-34 (2004).

Mohammad et al., "Secure Remote User Access Over Insecure Networks," Computer Communications, 29 (5):660-667 (2006).

Chang et al., "A Remote Password Authentication Scheme Based Upon ElGamal's Signature Scheme," Computers & Security, 13(2):137-144 (1994).

Jablon, D.P., "Strong Password-Only Authenticated Key Exchange," ACM Computer Communications Review, 26 (5):1-22 (1996).

Hwang et al., "A New Remote User Authentication Scheme Using Smart Cards," IEEE Trans. on Consumer Electron., 46(1):28-30 (2000).

Lee et al., "A Flexible Remote User Authentication Scheme Using Smart Cards," ACM Operating Systems Review, 36 (3):46-52 (2002).

Shen et al., "A Modified Remote User Authentication Scheme Using Smart Cards," IEEE Trans. on Consumer Electron., 49(2):414-416 (2003).

\* cited by examiner

METHODS FOR AUTHENTICATING A USER WITHOUT PERSONAL INFORMATION AND DEVICES THEREOF

This application claims the benefit of Indian Patent Application Filing No. 2193/CHE/2011, filed Jun. 29, 2011, which is hereby incorporated by reference in its entirety.

FIELD

This technology generally relates to methods and device for authentication and, more particularly, to methods for authenticating a user without personal information and devices thereof

BACKGROUND

Currently, when a user at a client computing device desires to access a secure application for a business process, an agent at an agent computing device is utilized to query and verify the requesting user. Typically, the agent will asks over the telephone or other communication medium predefined security questions particular to that user. If the user provides the correct responses to the queries to the agent, then user will be verified and granted access to the secure application to interact with the business process.

Unfortunately, the static nature of the stored security verification data for each user for the security questions is susceptible to misuse. For example, the agent involved in the verification could preserve the received security verification data for a user and then later misuse it for the agent's personal benefit. News regarding these types of security risks makes some users reluctant to try and access some secure applications on line which results in fewer online business transactions.

Another problem with this current verification process is with storage requirements for the personal security verification data for each user. The application service providers must maintain storage servers with this data which can be quickly accessed by an agent when needed for verification purposes. These additional storage requirements add expense and may not always provide the personal security verification data to agents as quickly as some user's may desire. As a result, again users may be less likely to access some secure applications on line which results in fewer online business transactions.

SUMMARY

A method for authenticating a user without personal information includes obtaining at a secure authentication computing apparatus a context identifier, a registration identifier of one of a plurality of string generator modules assigned to a client computing device requesting access, and a client string generated by the client computing device requesting access from an agent computing device associated with the client computing device requesting access. An authentication string is generated with the secure authentication computing apparatus based on the obtained context identifier and a corresponding one of the plurality of string generator modules provided to the client computing device requesting access based on the registration identifier. The requested access by the client computing device is granted with the secure authentication computing apparatus when the client string matches the authentication string.

A non-transitory computer readable medium having stored thereon instructions for authenticating a user without personal information comprising machine executable code which when executed by at least one processor, causes the processor to perform steps including obtaining a context identifier, a registration identifier of one of a plurality of string generator modules assigned to a client computing device requesting access, and a client string generated by the client computing device requesting access from an agent computing device associated with the client computing device requesting access. An authentication string is generated based on the obtained context identifier and a corresponding one of the plurality of string generator modules provided to the client computing device requesting access based on the registration identifier. The requested access by the client computing device is granted when the client string matches the authentication string.

A secure authentication computing apparatus includes a memory coupled to one or more processors which are configured to execute programmed instructions stored in the memory including obtaining a context identifier, a registration identifier of one of a plurality of string generator modules assigned to a client computing device requesting access, and a client string generated by the client computing device requesting access from an agent computing device associated with the client computing device requesting access. An authentication string is generated based on the obtained context identifier and a corresponding one of the plurality of string generator modules provided to the client computing device requesting access based on the registration identifier. The requested access by the client computing device is granted when the client string matches the authentication string.

This technology provides a number of advantages including providing more effective methods and devices to authenticate a user requesting access to a secure application or other data without the need for stored personal security verification information. With this technology, an additional hardware device or token, such as a smart card, is not required, while still providing the same level of security. This technology also facilitates forward secrecy and is resilient to replay, forgery, man-in-the-middle and insider attacks. Further, this technology helps securely enforce privacy related obligations faced by services providers.

DETAILED DESCRIPTION

Figure 1:
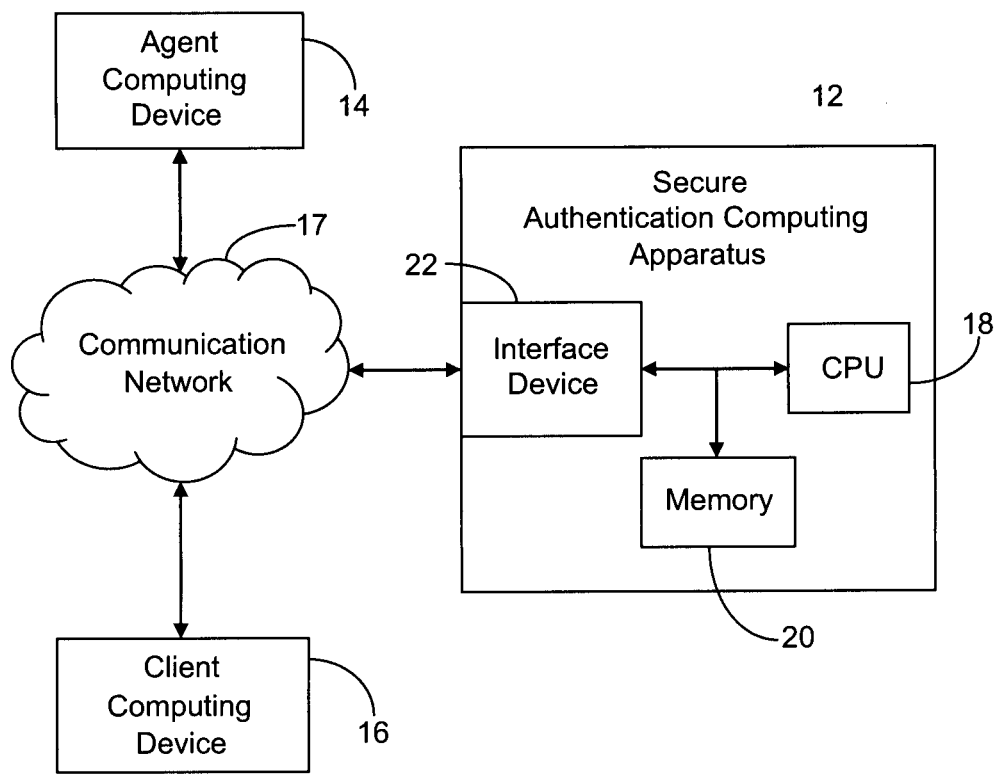
FIG. 1 is an environment with an exemplary secure authentication computing apparatus.

An environment 10 with an exemplary secure authentication computing apparatus 12 is illustrated in FIG. 1. The environment 10 includes the secure authentication computing apparatus 12, an agent computing device 14, and a client computing device 16 which are all coupled together by one or more communication networks, although this environment can include other numbers and types of systems, devices, components, and elements in other configurations, such as multiple numbers of each of these apparatuses and devices. This technology provides a number of advantages including providing more effective methods and devices to authenticate a user requesting access to a secure application or other data without the need for stored personal security verification information.

By way of example only, the secure authentication computing apparatus 12 manages authentication of a user to one or more secure applications or other stored data without the need for stored personal security verification information, although other numbers and types of systems could be used for the secure authentication computing apparatus 12 and other numbers and types of functions could be performed. By way of example only, the secure authentication computing apparatus 12 could also execute the one or more secure applications or could act as a security agent or proxy for one or more servers coupled to the secure authentication computing apparatus 12 which execute the one or more secure applications or store the secure data.

The secure authentication computing apparatus 12 includes a central processing unit (CPU) or processor 18, a memory 20, and an interface device 22 which are coupled together by a bus or other link, although other numbers and types of systems, devices, components, and elements in other configurations and locations can be used. The processor 18 in the secure authentication computing apparatus 12 executes a program of stored instructions for one or more aspects of the present technology as described and illustrated by way of the examples herein, although other types and numbers of processing devices and logic could be used and the processor could execute other numbers and types of programmed instructions.

The memory 20 in the secure authentication computing apparatus 12 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18 in the secure authentication computing apparatus 12, can be used for the memory 20 in the secure authentication computing apparatus 12.

The interface device 22 in the secure authentication computing apparatus 12 is used to operatively couple and communicate between the secure authentication computing apparatus 12 and the agent computing device 14 and the client computing device 16 via the communications network 17, although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

By way of example only, the agent computing device 14 is used to generate and provide a unique context identifier for each access request to the requesting client computing device 16 and the secure authentication computing apparatus 12 and the registration identifier of the string generator module assigned to the client computing device 16 along with the generated client string to the secure authentication computing apparatus 12, although other numbers and types of functions could be performed. Additionally, other types and numbers of systems, devices, components, and elements in other configurations could be used for the agent computing device 14.

By way of example only, the client computing device 16 is used to request initialization and registration with the secure authentication computing apparatus 12, to load and execute an assigned string generator module obtained from the secure authentication computing apparatus 12, and to generate a client string with the assigned string generator module based on the context identifier received from the agent computing device, although other types and numbers of functions could be performed. Additionally, other types and numbers of systems, devices, components, and elements in other configurations could be used for the client computing device 12. In this particular example, the client computing device 16 is a mobile device, although other types of client computing devices could be used with this technology.

The agent computing device 14 and the client computing device 16 each include a central processing unit (CPU) or processor, a memory, and an interface or I/O system, which are coupled together by a bus or other link, although each could comprise other numbers and types of devices, elements, and components in other configurations.

Although examples of the secure authentication computing apparatus 12, the agent computing device 14, and the client computing device 16 are described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof The examples may also be embodied as a computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
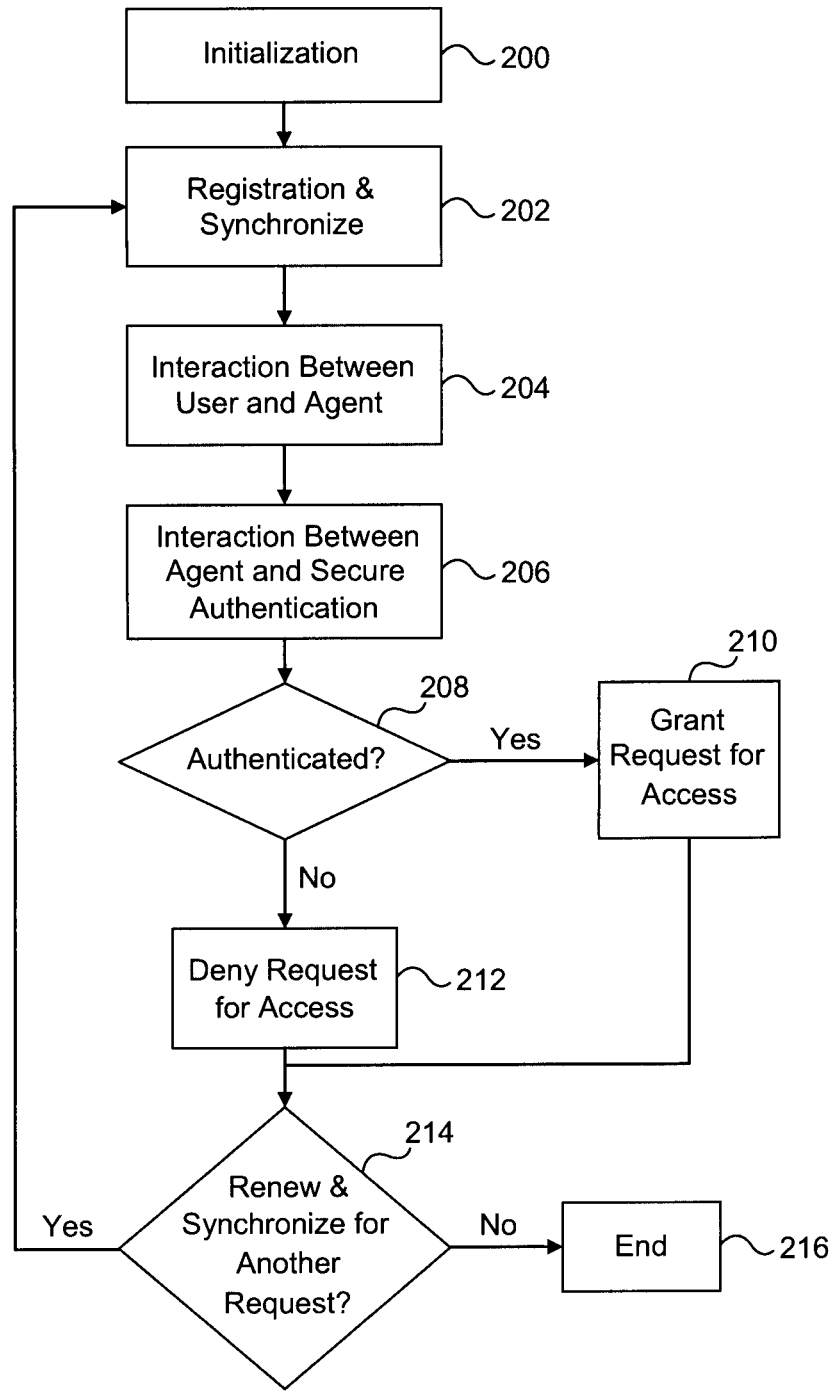
FIG. 2 is a flow chart of an exemplary method for authenticating a user without personal information.

An exemplary method for authenticating a user without personal information will now be described with reference to FIGS. 1-2. In step 200, the secure authentication computing apparatus 12 obtains a request to access a secure application or other secure data from the client computing device 16 which is not yet registered. In this particular example, the secure authentication computing apparatus 12 is executing the secure application and/or storing the secure data, although the secure authentication computing apparatus 12 could be a secure agent or proxy for one or more other servers or other computing devices which execute the one or more secure applications or store the secure data.

In response to this request, the secure authentication computing apparatus 12 starts the initialization and provides a registration kit which includes one of a plurality of string generator modules along with a registration identifier to the requesting client computing device 16, although other types and amounts of data and other modules could be provided. In this particular example, each of the string generator modules is a unique cryptographic process designed to generate a specific and unique client string or other security identifier based on obtained context identifier and the module which is used, although other unique identification generators could be used. The secure authentication computing apparatus 12 also stores the registration identifier which identifies the client computing device 16 which requested initialization and the assigned one of the string generator modules, although other types and amounts of registration and other security information relating to the client computing device 16 and also any server (not shown) on which the secure application is executed on and/or secure data is stored (in this example secure authentication computing apparatus 12 is executing the one or more secure applications and/or storing the secure data) could be obtained and stored.

In step 202, the client computing device 16 that submitted the request receives the registration kit, loads the received one of the plurality of string generator modules, and stores the registration identifier, although the requesting client computing device 16 could receive, execute and/or store other types of modules and data. The requesting client computing device 16 also transmits confirmation registration data to the secure authentication computing apparatus 12 once the received one of the plurality of string generator modules has been successfully loaded, although other types and amounts of data could be provided from the requesting client computing device 16 to the secure authentication computing apparatus 12, such as a client computing device ID, a client ID, and any string which uniquely identify the client computing device 16. The secure authentication computing apparatus 12 receives and stores the confirmation registration data from the requesting client computing device 16.

Additionally, the secure authentication computing apparatus 12 synchronizes with the requesting client computing device 16. in this example, the synchronization is with respect to a counter value at the secure authentication computing apparatus and a counter value at the client computing device 16 which are increased or decreased at every authentication request by the client computing device 16, although other types of synchronizations could be conducted.

In step 204, the secure authentication computing apparatus 12 notifies an agent computing device 14 about the request from the client computing device 16 to begin an authentication process, although other manners for initiating an authentication and engaging the agent computing device 14 could be used. The agent computing device 14 generates and provides a unique context identifier for this access request to the client computing device 16 that submitted the access request. In this particular example, the context identifier comprises a unique alphanumeric series, although other types of context identifiers could be generated and used. The client computing device 16 receives the context identifier for this access request, generates a client string or other unique identifier using the received one of the plurality of string generator modules and the context identifier, and provides the generated client string and the registration identifier to the agent computing device 14, although other types of unique identifiers could be generated in other manners.

In step 206, the agent computing device 14 provides the context identifier it generated for this access request to the secure authentication computing apparatus 12 along with the client string generated by the client computing device 16 and the registration identifier, although other types and amounts of authentication data could be provided. The secure authentication computing apparatus 12 receives the context identifier, client string, and the registration identifier, although other types and amounts of data could be received. The secure authentication computing apparatus 12 locates in memory the one of the plurality of string generator modules provided in the registration kit to the client computing device 12 based on the registration identifier. Using the identified one of the plurality of string generator modules and the context identifier from the agent computing device 14, the secure authentication computing apparatus 12 generates an authentication string, although other manners for generating the authentication string could be used.

In step 208, the secure authentication computing apparatus 12 determines whether the access request from the client computing device 16 is authenticated based on a comparison of the client string and the authentication string, although other manners for authenticating can be used. If in step 208, the secure authentication computing apparatus 12 determines the access request from the client computing device 16 was authenticated because the client string matches the authentication string, then the Yes is taken to step 210. In step 210, the secure authentication computing apparatus 12 grants the client computing device 16 the requested access to the secure application and/or data and then proceeds to step 214.

If in step 208, the secure authentication computing apparatus 12 determines the access request from the client computing device 16 was not authenticated because the client string differs from the authentication string, then the No is taken to step 212. In step 212 the secure authentication computing apparatus 12 blocks the access request and transmits a denial response to the client computing device 16.

In step 216, the secure authentication computing apparatus 12 determines if either a renewal of the initial access request or a different access request from the requesting client computing device 16 has been received. If in step 214, the secure authentication computing apparatus 12 determines either a renewal of the initial access request or a different access request from the client computing device 16 has been received, then the Yes branch is taken back to step 214 where the process repeats as described earlier with either the renewal of the initial access request or a different access request. If in step 214, the secure authentication computing apparatus 12 determines either a renewal of the initial access request or a different access request from the client computing device 16 has not been received, then the No branch is taken back to step 216 where this method ends.

Accordingly, as illustrated and described with the example herein this technology provides an authentication system which generates a unique authentication code every time there is an access request without the need to store, share or otherwise use any personal security verification data. Additionally, this technology does not depend on any type of dedicated hardware token, such as a smart card, for authentication while still providing a similar level of security. This technology also facilitates forward secrecy and is resilient to replay, forgery, man-in-the-middle and insider attacks. Further, this technology helps securely enforce privacy related obligations faced by services providers.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for authenticating a user without personal information, the method comprising:
   obtaining at a secure authentication computing apparatus a context identifier, a registration identifier of one of a plurality of string generator modules assigned to a client computing device requesting access, and a client string generated by the client computing device requesting access from an agent computing device associated with the client computing device requesting access, the obtained client string is generated based on the context identifier obtained from the agent computing device associated with the client computing device requesting access and the one of the plurality of string generator modules assigned to the client computing device requesting access;
   generating with the secure authentication computing apparatus an authentication string based on the obtained context identifier from the agent computing device associated with the client computing device requesting access and a corresponding one of the plurality of string generator modules provided to the client computing device requesting access based on the registration identifier; and
   granting with the secure authentication computing apparatus the requested access by the client computing device when the client string matches the authentication string.

2. The method as set forth in claim 1 wherein the obtaining further comprises obtaining at the secure authentication computing apparatus the client string based on the one of the plurality of string generator modules provided to the client computing device requesting access using the context identifier provided by the agent computing device.

3. The method as set forth in claim 1 further comprising:
   providing with the secure authentication computing apparatus the one of the plurality of string generator modules with the registration identifier to the client computing device in response to an initialization request from the client computing device; and
   storing with the secure authentication computing apparatus the registration identifier associated with the one of the plurality of string generator modules and the client computing device that made the initialization request.

4. The method as set forth in claim 1 further comprising denying with the secure authentication computing apparatus the requested access by the client computing device when the client string does not match the authentication string.

5. The method as set forth in claim 4 further comprising:
   identifying with the secure authentication apparatus when the client computing device is making another access request; and
   synchronizing with the secure authentication computing apparatus the client computing device with the secure authentication computing apparatus when another access request by the client computing device is identified.

6. A non-transitory computer readable medium having stored thereon instructions for authenticating a user without personal information comprising machine executable code which when executed by at least one processor, causes the processor to perform steps comprising:
   obtaining a context identifier, a registration identifier of one of a plurality of string generator modules assigned to a client computing device requesting access, and a client string generated by the client computing device requesting access from an agent computing device associated with the client computing device requesting access, the obtained client string is generated based on the context identifier obtained from the agent computing device associated with the client computing device requesting access and the one of the plurality of string generator modules assigned to the client computing device requesting access;
   generating an authentication string based on the obtained context identifier from the agent computing device associated with the client computing device requesting access and a corresponding one of the plurality of string generator modules provided to the client computing device requesting access based on the registration identifier; and
   granting the requested access by the client computing device when the client string matches the authentication string.

7. The medium as set forth in claim 6 wherein the obtaining further comprises obtaining the client string based on the one of the plurality of string generator modules provided to the client computing device requesting access using the context identifier provided by the agent computing device.

8. The medium as set forth in claim 6 further comprising:
   providing the one of the plurality of string generator modules with the registration identifier to the client computing device in response to an initialization request from the client computing device; and
   storing the registration identifier associated with the one of the plurality of string generator modules and the client computing device that made the initialization request.

9. The medium as set forth in claim 6 further comprising denying the requested access by the client computing device when the client string does not match the authentication string.

10. The medium as set forth in claim 9 further comprising:
    identifying when the client computing device is making another access request; and
    synchronizing the client computing device with the secure authentication computing apparatus when another access request by the client computing device is identified.

11. A secure authentication computing apparatus comprising:
    one or more processors;
    a memory coupled to the one or more processors which are configured to execute programmed instructions stored in the memory comprising:
       obtaining a context identifier, a registration identifier of one of a plurality of string generator modules assigned to a client computing device requesting access, and a client string generated by the client computing device requesting access from an agent computing device associated with the client computing device requesting access, the obtained client string is generated based on the context identifier obtained from the agent computing device associated with the client computing device requesting access and the one of the plurality of string generator modules assigned to the client computing device requesting access;

generating an authentication string based on the obtained context identifier from the agent computing device associated with the client computing device requesting access and a corresponding one of the plurality of string generator modules provided to the client computing device requesting access based on the registration identifier; and granting the requested access by the client computing device when the client string matches the authentication string.

12. The apparatus as set forth in claim 11 wherein the one or more processors is further configured to execute programmed instructions stored in the memory for the obtaining further comprises obtaining the client string based on the one of the plurality of string generator modules provided to the client computing device requesting access using the context identifier provided by the agent computing device.

13. The apparatus as set forth in claim 11 wherein the one or more processors is further configured to execute programmed instructions stored in the memory further comprising:

providing the one of the plurality of string generator modules with the registration identifier to the client computing device in response to an initialization request from the client computing device; and storing the registration identifier associated with the one of the plurality of string generator modules and the client computing device that made the initialization request.

14. The apparatus as set forth in claim 11 wherein the one or more processors is further configured to execute programmed instructions stored in the memory further comprising denying the requested access by the client computing device when the client string does not match the authentication string.

15. The apparatus as set forth in claim 14 wherein the one or more processors is further configured to execute programmed instructions stored in the memory further comprising:

identifying when the client computing device is making another access request; and synchronizing the client computing device with the secure authentication computing apparatus when another access request by the client computing device is identified.

* * * * *